(12) United States Patent
Van Tuel et al.

(10) Patent No.: US 10,793,927 B2
(45) Date of Patent: Oct. 6, 2020

(54) SEPARATION OF LIGNIN AND SUGARS FROM BIOMASS PRE-TREATMENT LIQUORS

(71) Applicant: Stichting Energieonderzoek Centrum Nederland, Petten (NL)

(72) Inventors: Marc Matheus Antonius Van Tuel, Petten (NL); Wouter Johannes Joseph Huijgen, Petten (NL); Henk Martin Van Veen, Petten (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 127 days.

(21) Appl. No.: 15/550,288

(22) PCT Filed: Feb. 16, 2016

(86) PCT No.: PCT/EP2016/053271
§ 371 (c)(1),
(2) Date: Aug. 10, 2017

(87) PCT Pub. No.: WO2016/131828
PCT Pub. Date: Aug. 25, 2016

(65) Prior Publication Data
US 2018/0030555 A1  Feb. 1, 2018

(30) Foreign Application Priority Data
Feb. 16, 2015  (NL) .................................. 1041192

(51) Int. Cl.
*C13K 13/00* (2006.01)
*C08H 8/00* (2010.01)
(Continued)

(52) U.S. Cl.
CPC .......... *C13K 13/002* (2013.01); *B01D 61/027* (2013.01); *B01D 71/52* (2013.01);
(Continued)

(58) Field of Classification Search
None
See application file for complete search history.

(56) References Cited

U.S. PATENT DOCUMENTS 2,022,654 A  12/1935  Dreyfus
4,470,851 A  9/1984  Paszner et al.
(Continued)

FOREIGN PATENT DOCUMENTS

EP  2 336 193 A1  6/2011
WO  WO-03/062430 A1  7/2003
(Continued)

OTHER PUBLICATIONS

Abdul Khalil, H.P.S. et al., "Peer-reviewed article chemical composition, anatomy, lignin distribution, and cell wall structure of Malaysian plant waste fibers introduction", Bioresources 1(2), Nov. 4, 2006, pp. 220-232.
(Continued)

*Primary Examiner* — Krishnan S Menon
(74) *Attorney, Agent, or Firm* — Foley & Lardner LLP

(57) ABSTRACT

The invention relates to an improved process for separating lignin and monomeric sugars from a liquor comprising lignin and monomeric sugars in a solvent mixture of water and at least one organic solvent, which employs membrane filtration techniques such as nanofiltration and selective water removal, preferably by permeation through a membrane which is selective for water molecules. The invention further relates to a modular system for executing the process according to the invention. The process and system according to the invention are particularly suitable to be incorpo-
(Continued)

rated with pre-treatment of lignocellulosic biomass, in particular by organosolv fractionation or solvolysis.

14 Claims, 4 Drawing Sheets

(51) Int. Cl.
    *C07G 1/00*     (2011.01)
    *C08H 7/00*     (2011.01)
    *C08L 97/00*     (2006.01)
    *B01D 61/02*     (2006.01)
    *B01D 71/52*     (2006.01)
    *C13K 1/04*     (2006.01)
    *C13K 11/00*     (2006.01)

(52) U.S. Cl.
    CPC ................ *C07G 1/00* (2013.01); *C08H 6/00* (2013.01); *C08H 8/00* (2013.01); *C08L 97/005* (2013.01); *C13K 1/04* (2013.01); *C13K 11/00* (2013.01); *C13K 13/007* (2013.01)

(56) References Cited

U.S. PATENT DOCUMENTS

| | | | |
|---|---|---|---|
| 2009/0061495 | A1 | 3/2009 | Beatty |
| 2009/0176286 | A1 | 7/2009 | O'Connor et al. |
| 2015/0354018 | A1* | 12/2015 | Nishino ................ B01D 61/04 127/37 |

FOREIGN PATENT DOCUMENTS

| | | |
|---|---|---|
| WO | WO-2007/120210 A2 | 10/2007 |
| WO | WO-2008/041840 A1 | 4/2008 |
| WO | WO-2010/074577 A1 | 7/2010 |
| WO | WO-2011/097720 A1 | 8/2011 |
| WO | WO-2012/000093 A1 | 1/2012 |
| WO | WO-2015/009145 A1 | 1/2015 |

OTHER PUBLICATIONS

Abels et al., "Membrane processes in biorefinery applications", Journal of Membrane Science, 2013, vol. 444, pp. 285-317.
Bioresources.com et al., "peer-reviewed article optimization of lignin peroxidate, manganese peroxidase, and lac production from ganoderma lucidum under solid state fermentation of pineapple leaf introduction", BioResources, Nov. 26, 2012, pp. 250-271.
Cybulska, I. et al., "Catalyzed modified clean fractionation of prairie cordgrass integrated with hydrothermal post-treatment", Biomass and Bioenergy, vol. 46, Nov. 1, 2012, pp. 389-401.
Dachun, G. et al., "Development of an integrated pretreatment fractionation process for fermentable sugars and lignin: Application to almond () shell*", Biomass and Bioenergy, Pergamon, Amsterdam, NL, vol. 35, No. 10, Aug. 24, 2011, pp. 4435-4441.
Garcia et al., "Energy and economic assessment of soda and organosolv biorefinery processes", Biomass and Bioenergy, 2010, pp. 1-10.
Ghose, "Measurement of cellulose activities", Pure & Applied Chemistry, vol. 59, 1987, No. 2, pp. 257-268.
Gonzalez Alriols et al., "Combined organosolv and ultrafiltration lignocellulosic biorefinery process", Chemical Engineering Journal, 2009, pp. 1-8.
Huijgen et al. "Fractionation of wheat straw by prehydrolysis, organosolv delignification and enzymatic hydrolysis for production of sugars and lignin" Bioresource Technology, 2012, vol. 114, pp. 389-398.
Huijgen et al., "Pretreatment and fractionation of wheat straw by an acetone-based organosolv process", Industrial & Engineering Chemistry Research, 2010, vol. 49, No. 20, pp. 10132-10140.
International Search Report issued in International Patent Application No. PCT/EP2016/053271, dated May 18, 2016.
International Search Report issued in International Patent Application No. PCT/NL2014/050481 dated Sep. 17, 2014.
International Search Report issued in International Patent Application No. PCT/NL2014/050095 dated Apr. 16, 2014.
Ming-Fei, L. et al., "Formic acid based organosolv pulping of bamboo (): Comparative characterization of the dissolved lignins with milled wood lignin", Chemical Engineering Journal, Elsevier Sequoia, Lausanne, CH, vol. 179, Oct. 20, 2011, pp. 80-89.
Nordin et al., "Chemical elemental characteristics of biomass fuels", Biomass and Bioenergy, Pergamon, Amsterdam, NL, vol. 6, No. 5, Jan. 1, 1994, pp. 339-347.
Omojasola, P.F. et al., "Cellulase production by some fungi cultured on pineapple waste", Nature and Science, 6(2), Jan. 1, 2008, pp. 64-79.
Papatheofanous, M.G. et al., "Two-stage acid-catalyzed fractionation of lignocellulosic biomass in aqueous ethanol systems at low temperatures", Bioresource Technology 54, Issue 3, Jan. 1, 1995, pp. 305-310.
Perez et al., "Selective acetone-water delignification of Eucalyptus urograndis: An alternative towards the biorefinery approach", The Open Agriculture Journal, 2010, vol. 4, pp. 145-152.
Phillips, M. et al., "The chemistry of lignin. IX. Lignin from Barley Straw", Journal of the American Chemical Society, vol. 56, Dec. 1, 1934, pp. 2707-2710.
Sun, F. et al., "Enhanced enzymatic hydrolysis of wheat straw by aqueous glycerol pretreatment", Bioresource Technology, Elsevier BV, GB, vol. 99, No. 14, Sep. 1, 2008, pp. 6156-6161.
Wildschut et al., "Ethanol-based organosolv fractionation of wheat straw for the production of lignin and enzymatically digestible cellulose", Bioresource Technology, 2013, vol. 135, pp. 58-66.
Zhang et al., "Organosols pretreatment of plant biomass for enhanced enzymatic saccharification", Green Chemistry, Jan. 2016, pp. 1-23.
Zhao et al., "Organosols pretreatment of lignocellulosic biomass for enzymatic hydrolysis", Appl. Microbiol Biotechnol, 2009, vol. 82, pp. 815-827.
Koundinya, Vikram. Agricultural Marketing Resource Center: Corn Stover. May 23, 2019. https://www.agmrc.org/renewable-energy/corn-stover.

* cited by examiner

SEPARATION OF LIGNIN AND SUGARS FROM BIOMASS PRE-TREATMENT LIQUORS

CROSS-REFERENCE TO RELATED APPLICATIONS

This application is the National Phase of International Patent Application No. PCT/EP2016/053271, filed Feb. 16, 2016, published on Aug. 25, 2016 as WO 2016/131828 A1, which claims priority to Netherlands Patent Application No. 1041192, filed Feb. 16, 2015. The contents of these applications are herein incorporated by reference in their entirety.

The present invention relates to an improved process for separating lignin and monomeric sugars from a liquid stream that typically originates from the organosolv process for biomass fractionating, as well as to a modular system for performing the process according to the invention.

BACKGROUND

Biomass, especially lignocellulosic biomass, is a valuable resource for the production of (bio)fuels, chemicals, performance products and energy. Lignocellulose is the most abundant renewable biomass available on land, and therefore relatively cheap. Many research efforts have been devoted to the development of processes for the cost-effective conversion of biomass, especially lignocellulosic biomass, to valuable compounds. The main structural components of biomass are cellulose, hemi-cellulose and lignin (see table 1 for approximate compositions of some biomass types). The cellulose component of biomass may for example be converted to glucose, which in turn may serve e.g. as a precursor for 'second-generation' bioethanol (by fermentation of glucose), and is thus suitable for the production of biofuels. However, to render such process economically attractive, the further components of biomass should preferably also be efficiently utilised, either directly or after conversion into valuable compounds. In this respect, the organosolv liquor and/or components therein have not found widespread application yet, as separation of these components (mainly lignin and monomeric sugars) from large amounts of liquor by currently-available technology is energy-consuming and costly. Valorisation of these components would render the use of lignocellulosic biomass for e.g. second-generation biofuels and chemicals economically more attractive.

TABLE 1

Compositions of the structural components of some biomass types (in wt % based on dry weight)

|  | glucan | mannan | xylan | other polysaccharides | lignin |
| --- | --- | --- | --- | --- | --- |
| Softwood | 35-50 | 10-20 | 2-10 | 3-10 | 25-32 |
| Hardwood | 30-45 | 1-4 | 10-25 | 2-5 | 20-30 |
| Herbaceous biomass | 25-40 | 0-2 | 15-25 | 3-8 | 10-20 |

Several techniques for the fractionation of lignocellulosic biomass are known in the art, including organosolv, solvolysis, Kraft pulping, acid hydrolysis, alkaline hydrolysis, steam explosion, carbon dioxide explosion, ammonia fiber expansion, sulfite pre-treatment, sulfite pulping, alkaline wet oxidation and ozonolysis. Such processes are also referred to as "pre-treatment of biomass". Notable examples of techniques employing organic solvents are organosolv and solvolysis (especially alcoholysis).

Fractionation of lignocellulosic biomass is conveniently accomplished by the so-called organosolv process, which delignifies lignocellulosic biomass and thereby improves the accessibility of the cellulose polymers for hydrolytic enzymes converting cellulose to glucose (see Zhao et al., *Appl. Microbiol. Biotechnol.* 2009, 82, 815-827 for a review, and Huijgen et al., *Bioresour. Technol.* 2012, 114, 389-398 and Wildschut et al., *Bioresour. Technol.* 2013, 135, 58-66 and Zhang et al., *Green Chem.*, 2016, 18, 360-381, for some recent advances in organosolv). Without pretreatment by means of e.g. organosolv, the cellulose within lignocellulosic biomass is poorly accessible for the hydrolytic enzymes, as it is shielded by other structural components in the biomass, such as lignin. Organosolv involves high-temperature treatment (typically between 140 and 220° C.) of the biomass with a mixture of water, a water-miscible organic solvent (e.g. ethanol or acetone) and optionally an amount of acid as catalyst. During organosolv, the lignocellulosic biomass is fractionated into a cellulose-enriched solid product stream (pulp) and a liquid product stream (liquor) comprising dissolved lignin (fragments), hemicellulose derivatives, such as (oligomeric and monomeric) carbohydrates and their dehydration products such as furfural and HMF, minerals, acids (organic acids formed such as acetic, formic and levulinic acid originating from the biomass as well as the optionally present acidic catalyst used during organosolv) and other components that are soluble in the liquid phase (including so-called extractives). Lignin is typically separated from the liquor by precipitation of the lignin by decreasing the organic solvent content of the liquor, by dilution with water in which lignin hardly dissolves and/or by evaporation (vacuum distillation) of the organic solvent. The precipitate is then removed from the aqueous suspension by centrifugation and decantation or by filtration. For large scale processes, distillation of the organic solvent is preferred as it prevents dilution of the product streams and enables direct reuse of the organic solvent in the organosolv process. However, distillation requires a high energy input, which is economically disadvantageous. Although distillation and subsequent reuse of the organic solvent would in theory also be possible after lignin precipitation by dilution with water, it would decrease process economy even further. Lignin precipitation by dilution with water is thus only used for research purposes on small-scale, mainly lab-scale.

Subjecting the organosolv liquor to ultrafiltration is known from González Alriols et al. (*Chem. Eng. J.* 2010, 157(1), 113-120) and Garcia et al. (*Biomass Bioenerg.* 2011, 35(1), 516-525), which disclose the use of several ultrafiltration membranes with varying molecular weight cut-offs to collect lignin samples of different molecular weights from an organosolv liquor. No efforts were taken to isolate monomeric sugars, and reuse of the solvents was only possible by distillation.

SUMMARY OF THE INVENTION

The invention relates to an improved process for separating lignin and monomeric sugars from a solution comprising lignin and monomeric sugars in a solvent mixture comprising water and an organic solvent, preferably an organosolv liquor, using membrane filtration techniques. The invention further concerns a modular system for performing the process according to the invention.

The process according to the invention is a large improvement over the prior art process involving distillation, which consumes much more energy as a result of complete distillation of the solvent. The present process does not require—and preferably avoids—distillation of the solvents, which are nonetheless obtained in sufficiently pure form to enable reuse thereof in a further organosolv process cycle. Energy efficiency of the present process is further enhanced by allowing the temperature to gradually decrease by passive cooling when the process progresses, as such eliminating (active or promoted) cooling and possible reheating of the liquid streams. Furthermore, the process according to the invention enables the isolation of both lignin and monomeric sugars from an organosolv liquor. Both components are as such available for further use or application. The present process provides a more energy and cost efficient approach to the isolation of these valuable components from an organosolv liquor.

DETAILED DESCRIPTION

The present invention relates to an improved process for separating lignin and monomeric sugars from a solution comprising lignin and monomeric sugars in a solvent mixture comprising water and an organic solvent. The process according to the invention comprises:
(a) subjecting the solution to nanofiltration over a membrane capable of retaining lignin and permeating at least monomeric sugars;
(b) subjecting a permeate originating from step (a) to selective water removal to obtain a suspension containing precipitated monomeric sugars;
(c) optionally precipitating lignin from a retentate originating from step (a); and
(d) optionally isolating precipitated monomeric sugars from the suspension originating from step (b).

In one embodiment, step (b) is performed directly following step (a), without any significant further alterations to the nanofiltration permeate obtained in step (a). In one embodiment, step (c) is performed directly following step (a), without any significant further alterations to the nanofiltration retentate obtained in step (a). In one embodiment, step (d) is performed directly following step (b), without any significant further alterations to the suspension obtained in step (b). In one embodiment, step (a) is performed directly following the organosolv step, without any significant further alterations to the liquor obtained therein. In an especially preferred embodiment, the process according to the invention does not comprise a step wherein solvent (organic solvent and/or water) is distilled, i.e. the process preferably does not comprise a distillation step.

In an especially preferred embodiment, the process according to the invention does not comprise a step wherein a liquid fraction (e.g. solution (such as a liquor) or suspension) is actively cooled and/or heated, more preferably no active cooling step, most preferably no step of active cooling and heating is implemented in the process according to the invention. The process and energy efficiency potential of the process according to the invention is fully used in case the liquid streams that are subjected to the series of steps remain "on temperature", i.e. the temperature of a particular step is equal to the temperature of the previous step, or some lowering in temperature between two subsequent steps by passive cooling of the liquid stream is allowed for. Since the temperature of a certain step may also vary during performance thereof, e.g. by passive cooling during the duration of the step, the temperature at which a certain step commences is in one embodiment 0-50° C., more preferably 0-30° C. lower than the temperature at which the directly preceding step is terminated.

Solution Comprising Lignin and Monomeric Sugars

The incoming solution subjected to nano filtration step (a) is a liquid composition comprising lignin and monomeric sugars, and typically further soluble components, which are dissolved in a solvent mixture comprising water and an organic solvent. The incoming solution is typically a liquor from the pre-treatment of biomass. Any type of biomass pre-treatment liquor is suitable in this respect, as long as lignin, monomeric sugars and the solvent mixture as defined above are present. The incoming solution may also be referred to as "biomass extract", such as "lignin-containing biomass extract" or "lignin- and monomeric sugar-containing biomass extract". Preferred liquors are selected from an organosolv liquor and a solvolysis liquor, more preferably from an organosolv liquor and an alcoholysis liquor. Most preferably, the solution is an organosolv liquor, more preferably an organosolv liquor obtainable by the organosolv process as defined further below. Both organosolv liquors and solvolysis liquors are known in the art, and are suitable in the context of the present invention. The skilled person finds further guidance in Zeng et al. *BioResources*, 2015, 10, 7738-7751 and Grisel et al. *Catalysis today*, 2014, 223, 3-10 (for solvolysis, in particular alcoholysis) and Zhao et al., *Appl. Microbiol. Biotechnol.* 2009, 82, 815-827 for a review, and Huijgen et al., *Bioresour. Technol.* 2012, 114, 389-398 and Wildschut et al., *Bioresour. Technol.* 2013, 135, 58-66 and Zhang et al., *Green Chem.*, 2016, 18, 360-381 (for organosolv). Preferred features of the organosolv process are further defined below.

Herein, the term "solvent mixture" refers to all solvents present in the solution. The solvent mixture comprises water and at least one organic solvent, preferably consists of water and at least one organic solvent, more preferably consists of water and one organic solvent. As the solution should be liquid at the processing conditions of both step (a) and (b), the organic solvent(s) should be liquid at these processing conditions. Any organic solvent suitable to be used during biomass pre-treatment, in particular organosolv or solvolysis, may be present in the solution. Suitable solvents include alcohols, esters, ethers, ketones, organic acids, ionic liquids (ILs), low transition temperature mixtures (LTTMs) and deep eutectic solvents (DESs). The organic solvent is preferably selected from the group consisting of alcohols, esters, ethers, ketones and mixtures thereof.

Preferably, the at least one organic solvent comprises an alcohol, an ester, an ether and/or a ketone, more preferably an alcohol or a ketone, most preferably a ketone. Preferred alcohols include methanol, ethanol, (iso)propanol, butanol, ethylene glycol, methoxyethanol and mixtures thereof, most preferred is ethanol. Preferred ethers include dimethoxyethane, tetrahydrofuran (THF), 1,4-dioxane and 1,3-dioxolane. Preferred ketones include acetone, butanone (=methyl ethyl ketone or MEK), methyl isobutyl ketone (MIBK), cyclohexanone, acetoacetic (3-oxobutanoic) acid esters, and levulinic (4-oxopentanoic) esters, such as methyl levulinate and ethyl levulinate, most preferred is acetone. Herein, solvents having both a ketone and an ester functionality are listed as ketones. Preferred esters, i.e. solvents not having a separate ketone functionality, include $C_3$-$C_5$ esters such as ethyl acetate. In an especially preferred embodiment, the organic solvent is methanol, ethanol or acetone, more preferably it is ethanol or acetone, most preferably it is acetone. Using ketones, especially acetone, as solvent, the precipitation of sugar monomers, especially xylose, during step (c) is facilitated. Preferably, organic solvent(s) and water are present in an organic solvent to water weight ratio of 20/80-80/20, more preferably 30/70-75/25, even more preferably 35/65-70/30, most preferably 40/60-60/40.

Apart from the mixture of solvents, the solution comprises solutes. The solution comprises at least lignin and (monomeric) sugars as solutes. Typically, the lignin content of the solution subjected to nanofiltration is 0.25-25 wt %, preferably 0.5-20 wt %, more preferably 1-10 wt %, based on total weight of the solution. The solution typically further comprises hemicellulose degradation products, such as monomeric sugars (e.g. xylose, glucose, arabinose, galactose, rhamnose and/or mannose), dimeric and oligomeric saccharides, e.g. containing the monomeric units mentioned, and glycosides, e.g. containing the monomeric units mentioned such as ethyl-glucosides and ethyl-xylosides (e.g. ethyl-α-D-xylopyranoside and ethyl-β-D-xylopyranoside). Typically, the total sugar (monomeric, dimeric, oligomeric carbohydrates, as well as glycosides) content of the solution subjected to nanofiltration is 0.01-20 wt %, preferably 0.02-10 wt %, more preferably 0.1-7 wt %, based on total weight of the solution.

Further, the solution subjected to nano filtration preferably comprises minor amounts of further components including acidic catalyst and soluble extractives that originate from the biomass. The solution may comprise a minor amount of acid (e.g. 0.01-3 wt % of the total weight of the solution), which may e.g. originates from the acidic catalyst of the organosolv and/or from the biomass itself, however, it is preferred that the acid is removed prior to subjecting the solution to step (a) of the process according to the invention, e.g. through neutralisation, e.g. with a concentrated aqueous NaOH solution. Any type of acid suitable for organosolv may present in the solution, although typically a mineral acid is used, preferably sulphuric acid. Further components that are typically present in the solution may originate from the biomass subjected to organosolv, and include ash, proteinaceous material, organic acids, sugar derivatives (e.g. furfural or related compounds). These are typically extracted from the biomass during pre-treatment, such as organosolv, and end up in the liquid fraction, which is subjected to the process according to the present invention.

Since the present process is especially suitable for separating lignin from a biomass pre-treatment liquor, it is preferred that the process according to the invention includes subjecting lignocellulosic biomass to pre-treatment prior to step (a), to obtain a liquor and a pulp, as known in the art, and subsequently using the liquor as solution in step (a). In the context of this embodiment, the process according to the invention is for separating lignin and monomeric sugars from biomass. In one embodiment, the biomass pre-treatment is organosolv or solvolysis, in particular alcoholysis. In one embodiment, the biomass pre-treatment is solvolysis, in particular alcoholysis. In one embodiment, the biomass pre-treatment is organosolv. Any type of lignocellulosic biomass may be used as feedstock for the pre-treatment, such as hardwood, softwood and herbaceous biomass.

Organosolv

Since the present process is especially suitable for separating lignin from an organosolv liquor, it is preferred that the process according to the invention includes subjecting lignocellulosic biomass to organosolv prior to step (a), to obtain a liquor and a pulp, as known in the art, and subsequently using the liquor as solution in step (a). In the context of this embodiment, the process according to the invention is for separating lignin and monomeric sugars from biomass. In principle, any type of organosolv as known in the art may be performed prior to step (a). Likewise, any type of lignocellulosic biomass may be used as feedstock for the organosolv, such as hardwood, softwood and herbaceous biomass. Organosolv typically involves the treatment of biomass with a treatment liquid comprising water, at least one organic solvent and optionally an acidic catalyst, at elevated temperature, e.g. 100-250° C., more typically 120-220° C. Preferred organic solvents to be used in the treatment liquid are defined above.

In one preferred embodiment, ketone-based, more preferably acetone-based, organosolv is used, which renders a liquor containing a mixture of water and acetone as solvents. The use of a treatment liquid comprising a ketone, especially acetone, as organic solvent is preferred, as the precipitation of sugar monomers, especially xylose, during step (b) is facilitated. In a further preferred embodiment, organosolv at a reduced temperature, i.e. below 170° C., preferably 120-170° C., more preferably 120-150° C., is used, since the liquor obtained thereby has the optimal temperature for being subjected to step (a) of the process according to the invention, without the need of actively changing the temperature of the solution and associated costs. Also, the autogenic pressure of the organosolv liquor obtained as such, typically 5-10 bar, is ideally suited for performing the nanofiltration of step (a). It is especially preferred that the organosolv is acetone-based and performed at a temperature below 170° C., preferably 100-160° C., more preferably 120-150° C. Such an organosolv process is known from WO 2014/126471 or PCT/NL2014/050481, both of which are incorporated herein by reference in their entirety.

It is preferred that the organosolv reaction is not continued after discharging the organosolv liquor from the organosolv reactor. This may for example be accomplished by performing step (a) at least 30° C. lower, preferably at least 50° C. lower, than the organosolv step, or by performing a neutralization step between organosolv and step (a), most preferably a neutralization step is performed. Neutralization is typically performed by addition of a base, preferably a basic aqueous solution, most preferably an aqueous solution of NaOH is used. Preferably, the pH of the liquor is about 5.5-7.5 after neutralization, more preferably 6-7. A neutralization step is advantageous, since it does not require (energy consuming) active cooling and increasing the pH of the liquor is typically beneficial for the equipment and the membranes employed in the process according to the invention. A further disadvantage of cooling is that the subsequent steps are preferably performed at (more or less) the same temperature as the organosolv step, which is optimal for process economy and performance.

Nanofiltration (Step (a))

The nanofiltration of step (a) may be performed over any nanofiltration membrane known in the art that is capable of retaining lignin and permeating monomeric sugars, such as xylose, glucose, arabinose, galactose, rhamnose and mannose. Monomeric sugars typically have a molecular weight below 190 Da, so it is preferred that the molecular weight cut-off of the membrane is at least 200 Da, more preferably at least 300 Da, most preferably at least 400 Da. Membranes having a molecular weight cut-off of at least 400 Da are preferred, as these allow the permeation of monomeric sugars as well as dimeric ones, i.e. disaccharides. Disaccharides such as cellobiose, xylosyl-glucose, arabinosyl-galactose and the like, are also valuable to be collected together with the monomeric sugars. Organosolv lignin typically has a molecular weight of at least 3000 Da, so it is preferred that the molecular weight cut-off of the membrane is at most 2500 Da, more preferably at most 2000 Da, most preferably at most 1000 Da, to retain the lignin.

Step (a) is typically performed at a temperature of 20-250° C., more preferably 30-200° C., even more preferably 50-170° C., most preferably 100-150° C. Preferably, the solution has a temperature of 20-250° C., more preferably 30-200° C., even more preferably 50-170° C., most preferably 100-150° C., at the beginning of step (a). Conveniently, the temperature at which step (a) is performed is the same temperature as that at which the incoming solution is obtained (or slightly lower due to passive cooling). As the incoming stream is preferably an organosolv liquor, it is preferred that step (a) is performed at a temperature of 100-250° C., more preferably 120-150° C. As such, step (a) is performed at an optimal temperature as fractionation of the liquor in a lignin-rich retentate and a permeate comprising monomeric sugars and optional further compounds is effectively accomplished, and at the same time no heating or cooling of the liquor originating from the organosolv reaction mixture is needed, further increasing the energy efficiency of the process according to the invention. Permeation through the nanofiltration membrane is typically accelerated by applying a transmembrane pressure across the membrane. The transmembrane pressure is preferable at least 0.5 bar, more preferably at least 1 bar, most preferably at least 2.5 bar. Higher transmembrane pressures are preferred for creating a larger flux through the membrane, which in turn increases the (cost) efficiency of the process according to the invention. Although the maximum of the transmembrane pressure is not critical and only limited by technical feasibility, for practical reasons it is preferred that the transmembrane pressure does not exceed 50 bar, more preferably 25 bar, most preferably 15 bar. Transmembrane pressure is conveniently applied by pressurizing the feed/retentate side of the nanofiltration membrane. As such, the conditions at the feed/retentate side, i.e. wherein the incoming solution is received, are comparable to the conditions that typically are present within an organosolv reactor. Liquor having a temperature of 120-220° C. and a pressure of 2.5-40 bar, preferably 5-15 bar, most preferably 5-10 bar, is conveniently discharged from the organosolv reactor, and is thus suitable as an incoming solution for the process of the invention without any further alteration (heating, cooling, (de)pressurising). The permeate side of the nanofiltration membrane is conveniently at ambient pressure, such that the autogenic pressure of the organosolv liquor may be used to apply the transmembrane pressure.

The nanofiltration of step (a) is preferably performed using a volume concentration factor (VCF) of 1.5-15, more preferably 2-10, most preferably 2.5-5. The VCF is the factor at which a liquid composition is concentrated upon filtration, i.e. the total volume of the incoming stream prior to filtration divided by the total volume of the retentate after filtration, irrespective of the total solid content. Thus, when 5 L of a liquid composition is fractionated over a nanofiltration membrane into a permeate of 4 L and a retentate of 1 L, this nanofiltration process operates with a VCF of 5/1=5. The nanofiltration of step (a) is preferably performed using a permeability of at least 50 g/m$^2$·h·bar, more preferably at least 150 g/m$^2$·h·bar, even more preferably at least 500 g/m$^2$·h·bar, most preferably at least 1 kg/m$^2$·h·bar. Although it is generally preferable to have a permeability as high as possible, the permeability typically is 5 kg/m$^2$·h·bar or lower, or even 2.5 kg/m$^2$·h·bar or lower.

Any type of nanofiltration membrane may be used, such as ceramic membranes, and polymeric membranes, and module configurations like spiral wound or tubular as long as the membrane and module is capable of withstanding the operating conditions and still performs (optimally) at those conditions. The skilled person knows how to assess this and may find further guidance in He et al., *Biotechnol. Adv.* 2012, 30, 817-858. Suitable membranes include ceramic membranes and polymeric membranes on a ceramic support, like alumina, titania or zirconia, as existing polymeric supports are not stable at the higher temperatures. It is preferred that the nano filtration membrane is capable of operating at 140-220° C. and 2.5-40 bar, preferably 5-15 bar. Also, the solution subjected to step (a) is typically (slightly) acidic, in view of the presence of acid catalyst that is often used in the organosolv reaction and the organic acids that are formed during the organosolv process, although the solution may be neutralized prior to step (a). Preferably, the nanofiltration membrane is capable of operating at the processing conditions in a slightly acidic environment. Hence, ceramic or inorganic membranes or membranes having a ceramic or inorganic support are preferred. Preferably, the ceramic membrane is based on alumina (e.g. alpha or gamma), titania, zirconia, silicon carbide or silica, preferably alumina, titania, zirconia or silica. Preferably, the ceramic support is based on alumina, titania, zirconia, silicon carbide or silica, preferably alpha-alumina. The ceramic support as defined above can also be used as support of a polymeric (organic) top layer, wherein support and top layer together form the nano filtration membrane. The polymeric top layer preferably comprises a polyether, more preferably a sulfonated polyether, most preferably the polymeric top layer comprises sulfonated polyether ether ketone (SPEEK). Most preferably, the nanofiltration membrane comprises a ceramic carrier and a polymeric top layer comprising, more preferably consisting of SPEEK. It was found that using such membranes more than 95 wt %, typically 95-99 wt %, retention of lignin was achievable, while substantially all monomeric sugars (99-100 wt %) permeated and ended up in the permeate.

The nano filtration of step (a) separates the incoming solution into a retentate and a permeate. The ratio of solvents in the solvent mixture of water and organic solvent(s) is hardly affected during nanofiltration. Thus, both the retentate and the permeate are liquid compositions comprising a mixture of water and organic solvent(s) as defined above for the incoming solution. The retentate is enriched in lignin and depleted in monomeric sugars and optionally further small molecules such as acid, minerals, etc. The retentate can be regarded a concentrated organosolv liquor, as it contains the essential components thereof, i.e. lignin, water and organic solvent(s). The lignin content of the retentate is typically at least 1 wt %, preferably 2-25 wt %, more preferably 3-20 wt %, based on total weight of the retentate. The permeate on the other hand is depleted in lignin, while the concentration of monomeric sugars and optionally further small molecules is hardly altered with respect to the incoming solution. Typically, the permeate comprises at most 0.25 wt % preferably at most 0.1 wt %, most preferably at most 0.05 wt % lignin, and 0.01-10 wt %, preferably 0.02-10 wt %, most preferably 0.1-7 wt % monomeric sugars, based on total weight of the permeate. The nanofiltration permeate is subjected to selective water removal in step (b), and the retentate is preferably subjected to lignin precipitation in step (c).

Selective Water Removal (Step (b))

The permeate originating from the nano filtration of step (a) is subsequently subjected to a selective water removal step. Although any type of selective water removal is suitable, it is preferably accomplished by selective permeation of water or by selective adsorption of water, more preferably by selective permeation. During step (b), water is selectively removed from the permeate originating from the nano filtration of step (a), as such increasing the organic solvent content of the nanofiltration permeate. During selective water removal, the content of organic solvent in the solvent mixture of solvents gradually increases and in view of this increase in organic solvent content the monomeric sugars, which are well soluble in water but not in organic solvents, precipitate.

Generally, selective permeation is used to separate a mixture of liquids by (partial) permeation of one type of solvent molecules through a membrane, while the molecules of the other solvent remain in the retentate. Selective permeation according to the invention employs a membrane that is selective for water, i.e. the organic solvent molecules remain in the selective permeation retentate, together with all solutes present in the incoming nanofiltration permeate, while water permeates through the membrane. The permeate originating from selective permeation of step (b) thus consists essentially of water. Typically, the permeate contains at most 1 wt % of organic solvent. Selective permeation is preferably accomplished by pervaporation or by vapour permeation.

Pervaporation or vapour permeation are very similar techniques, in which water molecules selectively permeate through a membrane, the difference being that the water molecules on the feed side are either in the liquid state or in the gaseous state. During pervaporation, water molecules in the liquid state are fed to the membrane and are subsequently evaporated into the vapour phase. Thus, the permeate of the pervaporation of step (b) is water vapour. Evaporation of the water molecules during permeation through the membrane is preferably effectuated by employing a reduced pressure, preferably vacuum of e.g. 0.1 bar or lower, at the permeate side of the membrane, while the retentate side of the membrane is kept at ambient pressure or above. The water vapour pressure on the feed side has to be higher than the water vapour pressure on the permeate side in order to transport of water. During vapour permeation, water molecules are fed in the gas phase and permeate the membrane in the gas phase. Vapour permeation is typically performed at a temperature above the boiling point of the mixture of water and organic solvent(s) and/or by placing the membrane above the liquid level, such that water molecules that are present in the vapour phase above the liquid in view of the vapour pressure, are capable of permeating. Vapour permeation is preferred over pervaporation, as the membrane is not in direct contact with the liquid phase. As such, monomeric sugars are not able to precipitate on the membrane and fouling of the membrane is prevented.

Any type of membrane that is known in the art to be selective for permeation of water molecules, while retaining the molecules of organic solvents is suitable to be used in step (b) of the process according of the invention. The skilled person may find guidance in e.g. Smitha et al., *J. Membr. Sci.* 2004, 241, 1, 1-21. Suitable membranes include polyvinyl alcohol-based polymeric membranes, polyimide-based membranes, zeolite membranes like zeolite A, silica membranes and organic-inorganic hybrid silica membranes. Organic-inorganic hybrid silica membranes include HybSi membranes, known from e.g. Castricum et al. *J. Mater. Chem.* 2008, 18, 2150-2158 and Agirre Arisketa et al. *Sep. Purif. Technol.* 2014, 121, 2-12. The selective permeation of step (b) preferably employs an organic-inorganic hybrid silica membrane. Such membranes are resistant to high temperatures and transmembrane pressures, and are thus especially suitable to be used in step (b). Higher temperatures and transmembrane pressures lead to larger fluxes which in turn improve the (cost) efficiency of the process according to the invention.

Preferred membranes have a polymeric (organic) or ceramic support coated with alkylene-bridged or arylene-bridged organosilane moieties. The pervaporation membrane is preferably represented by the average formula $(O_{0.5})_3Si-L-Si(O_{0.5})_3$, wherein L represents the alkylene or arylene bridge. Herein, L=$(CHR)_n$, phenylene or biphenylene, preferably L=$(CHR)_n$ and the pervaporation membrane is represented by $(O_{0.5})_3Si-(CHR)_n-Si(O_{0.5})_3$. When L=$(CHR)_n$, n=1-7, preferably n=1 or 2, and R=H or $CH_3$ when n=1, and R=H when n=2-7. Preferably, R=H. $O_{0.5}$ indicates that that the oxygen atom is also bound to a further silicon atom. Thus, on average each silicon atom in the bulk of the material is bound to three oxygen atoms and one bridging carbon atom. In other words, on every three Si—O—Si links, there is about one Si—L—Si link present in the membrane material. It will be understood that the exact chemical formula deviates from those given here at the boundaries of the membrane, where e.g. monovalent alkyl moieties may be attached to silicon atoms and/or silanol (—Si—OH) groups may be present. Hence, the gross chemical formula of the organosilane is thus preferably $[Si_2O_3((CH_2)_n)]_x$. Minor deviations from the precise ratio do not detract significantly from the outstanding performance of these membranes in step (b). Step (b) thus preferably employs a membrane comprising organosilane moieties represented by $[Si_pO_q(CH_2)_n)_r]_x$, wherein p=1.6-2.4, preferably p=1.9-2.1, more preferably about 2, q=2.5-3.5, preferably 2.8-3.2, more preferably about 3 and r=0.6-1.4, preferably 0.9-1.1, more preferably about 1. Preferably, q+r=(1.6-2.4)×p, more preferably (1.8-2.2)×p, most preferably (1.95-2.05)×p. x merely denotes the size of the membrane and its value is considered irrelevant in the context of the present invention. n denotes the size of the alkylene moiety that bridges two silicon atoms, and affects the pore size and hydrophilicity of the membrane.

For most efficient and selective water permeation, n is preferably 1-3, most preferably n=2. Instead of saturated alkylene $(CH_2)_n$ (or $C_nH_{2n}$) groups, unsaturated groups $C_nH_{(2n-2)}$ (e.g. vinylene), $C_nH_{(2n-4)}$ (e.g. butenylene) or $C_nH_{(2n-6)}$ or $C_nH_{(2n-8)}$ (e.g. phenylene) are also suitable. Part of the Si—$(CH_2)_n$—Si linking groups between silicon atoms may be replaced by pairs of terminal Si—$(CH_2)_n$H groups, such as methyl or ethyl, as described e.g. in WO 2007/081212, incorporated herein by reference in its entirety; such part is preferably less than 40%, more preferably less than 20%, most preferably less than 10%.

The hybrid silica based (HybSi) membranes typically have nanopores having a diameter typically below 1.5 nm or even below 1.0 nm. Preferably the pore size is 2-8 Å, more preferably 3-6 Å, most preferably about 4 Å. Pore sizes are given as obtained by Kelvin pore size distribution measured by permporometry. A further advantage of using such a membrane is the narrow pore size distribution, which gives rise to hardly any false permeations, e.g. by a molecule of acetone. Such membranes are known in the art, e.g. from WO 2007/081212, WO 2010/008283, WO 2013/066184 and WO 2014/025259, all of which are herein incorporated by reference in their entirety, and these membranes may be prepared as described therein. Preparation typically involves preparing a sol of a bis-triethoxysilyl precursor, which is coated on a support (e.g. γ-alumina) and subsequently calcined. Preferred precursors are bis-triethoxysilylmethane (BTESM) for n=1 and R=H, bis-1,1-triethoxysilylethane for n=1 and R=CH$_3$ and bis-1,2-triethoxysilylethane (BTESE) for n=2 and R=H.

Generally, selective adsorption of water involves contacting a mixture (solution) of water, an organic solvent and typically one or more solutes with an adsorbent which selectively adsorbs water and does not or hardly adsorb organic solvent molecules. In the selective adsorption of step (b), the nanofiltration permeate originating from step (a) or the solvent mixture comprised therein is contacted with a water-selective adsorbent. Any type of water-selective adsorbent as known in the art may be used in step (b). Preferably, molecular sieves (e.g. zeolites) having a typical minimum pore diameter of 2.8-4.0 Å, preferably 3.0-3.5 Å, are used. The contacting may occur when the nanofiltration permeate originating from step (a) is in the liquid phase or in the vapour phase, while the adsorbent is solid under the processing conditions. Preferably, the nanofiltration permeate originating from step (a) is in the liquid phase. Preferably, vaporous solvent molecules are contacted with the adsorbent while the solutes remain in the liquid solvent mixture that together form the nanofiltration permeate. Such a set-up typically involves placing the adsorbent above the liquid level of the nanofiltration permeate, such that the solvent molecules present in the vapour phase (in view of the vapour pressure) are able to contact the adsorbent, i.e. only the solvent mixture (in the vapour phase) is contacted with the selective adsorbent and not the nanofiltration permeate per se. As only water is adsorbed, the partial pressure of water decreases and additional water will evaporate from the nanofiltration permeate, as such decreasing the water content in the (liquid) nanofiltration permeate. Selective water adsorption is known in the art, e.g. from WO 2012/128624, which is incorporated herein by reference in its entirety. The selective adsorption of step (b) of the process according to the invention is preferably accomplished by performing steps (b) and (d), more preferably steps (b)-(d), as described in WO 2012/128624. Selective adsorption as water removal of step (b) of the process according to the invention affords a composition, typically a liquid phase, mainly comprising organic solvent and all solutes as originally present in the nanofiltration permeate originating from step (a) and being depleted in water compared to the nanofiltration permeate, and an adsorbent loaded with water. The loaded adsorbent is typically regenerated, e.g. by drying at 200-400° C., after which it may be used again in selective adsorption. The liquid phase obtained by the selective adsorption of step (b) is typically a suspension of precipitated sugars in the organic solvent. This liquid phase is substantially identical to the retentate obtained if the water removal of step (b) is accomplished by selective permeation of water.

Step (b) is typically performed at a temperature of 20-250° C., more preferably 50-200° C. Selective permeation is preferably performed at a temperature above 50° C., more preferably above 100° C. An upper limit of the temperature is solely governed by the resistance of the membrane to temperature and the liquid or gas medium, although for practical and cost efficiency reasons it is preferred that the temperature does not exceed 250° C., more preferably 200° C. In case step (b) involves pervaporation, it is especially preferred that the temperature is 50-250° C., more preferably 110-160° C., most preferably 120-150° C. In case step (b) involves vapour permeation, it is especially preferred that the temperature is 100-250° C., more preferably 100-200° C., most preferably 110-150° C. For selective adsorption, the temperature may be somewhat lower, preferably 20-150° C., most preferably 50-100° C. Conveniently, the temperature at which step (b) is performed is the same as the temperature at which step (a) is performed (or slightly lower due to passive cooling). Most preferably, no active cooling or heating is performed between step (a) and step (b), to optimize the process efficiency and reduce costs for heating or (active) cooling. As such, step (b) is performed at an optimal temperature for selective permeation of water molecules through the membrane or selective adsorption of water molecules, and sufficient precipitation of monomeric sugars, and at the same time no heating or cooling of the permeate originating from step (a) is needed, further increasing the energy efficiency of the process according to the invention.

During selective water removal, the content of organic solvent in the solvent mixture gradually increases as water molecules permeate the membrane or adsorb to the adsorbent. In view of this increase in organic solvent content the monomeric sugars, which are well soluble in water but not in organic solvents, precipitate. The incoming solution may contain (minor amounts) of further components that are poorly soluble in water, such as dimeric and oligomeric saccharides and glycosides. Such components typically co-precipitate with the monomeric sugars during step (b). The water-depleted phase originating from step (b) may thus contain, in addition to the monomeric sugars, one or more of dimeric and oligomeric saccharides and glycosides. The presence of (traces of) such components do not hamper further processing of the monomeric sugars and add to the total yield of valuable components extracted from the original biomass. Glycosides may for example be used as substrate for transglycosylation (see e.g. Bouxin et al., *Biores. Technol.* 2014, 151, 441-444).

The water-depleted phase containing precipitated monomeric sugars obtained by the selective water removal of step (b) is typically a suspension. Thus, the retentate of selective permeation as well as the water-depleted phase obtained by selective adsorption is referred to as "suspension". As the solubility of monomeric sugars in the organic solvent from which water is removed, further decreases when the temperature decreases, it is preferred that after or during the selective water removal the temperature is reduced, e.g. from above 100° C. to room temperature. Typically, a reduction in temperature of 25-150° C., preferably 50-100° C., is accomplished during or, preferably, after selective water removal. Reduction in temperature is conveniently performed by leaving the water-depleted phase (e.g. the retentate of selective permeation) undisturbed for some time to allow it to cool down to ambient temperature. Alternatively, suitable means as known in the art to actively cool the suspension may be used, such as heat exchanger, radiator, pumpable ice technology, evaporation. The optionally cooled down suspension comprising precipitated monomeric sugars is then preferably fed to step (d).

Lignin Precipitation (Step (c))

The retentate originating from the nano filtration of step (a) is preferably subjected to lignin precipitation. Lignin precipitation may be accomplished in any manner known in the art. In principle, any technique that is capable of precipitating lignin from an organosolv liquor is suitable as step (c), since the retentate originating from step (a) can be considered a concentrated organosolv liquor. Typically, precipitation of lignin is effectuated by decreasing the organic solvent content of the liquor, to e.g. below 30 wt %, preferably below 25 wt % or even below 20 wt %, e.g. by dilution with water (or another solvent in which lignin does not dissolve), by preferential evaporation of the organic solvent, or by selectively permeating the organic solvent through a membrane. Dilution with water typically employs addition of 2-5, preferably about 3, parts by weight of water to one part of retentate. To facilitate evaporation, it is preferred that the organic solvent present in the incoming solution of the process according to the invention has a boiling point below that of water. However, especially when the boiling point of the organic solvent is close to or above that of water, both the water and the organic solvent may be evaporated to obtain a solid residue which typically consists essentially of lignin, which is particularly feasible when step (a) employs a high VCF (e.g. above 5).

For selective permeation to precipitate lignin, the retentate originating from step (a) is subjected to permeation though a membrane that is selective for permeation of the organic solvent. Suitable polymeric membranes are known from J. Niemisto et. al., *J. Membr. Sci.* 2013, 444 p. 9-15. Especially suited are the HybSi-based membranes represented by $[Si_pO_q((CH_2)_n)_r]_x$ as described above, wherein $n \geq 8$ and/or monovalent moieties having a minimum length of 6 carbon atoms are attached to silicon. Thus, a suitable membrane comprises a hybrid silica based layer represented by $(R)_3Si-(CH_2)_n-Si(R)_3$, wherein each R individually $O_{0.5}$, as defined above, or a monovalent alkyl moiety having m carbon atoms, and wherein $n \geq 8$ and/or $m \geq 6$. Thus, in one embodiment, the selective permeation membrane for step (c) comprises a hybrid silica based layer represented by $(O_{0.5})_3Si-(CH_2)_n-Si(O_{0.5})_3$, wherein $n \geq 8$, preferably, n=8-20. In one embodiment, the selective permeation membrane for step (c) comprises a hybrid silica based layer represented by $(R)_3Si-(CH_2)_n-Si(R)_3$, wherein each R individually is 00.5 or a monovalent alkyl moiety having m carbon atoms, wherein $m \geq 6$, preferably m=6-30, wherein at least 30% of the silicon atoms contain at least once the monovalent alkyl moiety as R, and preferably wherein n=1-20. Using such alkylene bridges and/or such monovalent alkyl substituents, the selectivity of such membranes is turned around from water-selectivity to organic solvent-selectivity. Such selective permeation of organic solvents is known from e.g. WO 2011/145933, which is incorporated herein by reference in its entirety.

Precipitation is preferably followed by removal of the precipitate by centrifugation and subsequent decantation or by filtration. As such, isolated lignin is obtained as solid phase, e.g. the residue of the decantation step or the retentate of the filtration step. Conveniently, at least part of the remaining liquid phase, e.g. the decant of the decantation step or the filtrate (permeate) of the filtration step, may be reused or recycled as (part of a) treatment liquid in an organosolv process, in particular of the organosolv process that is preferably implemented prior to step (a) of the process according to the invention. Said part preferably includes at least the organic solvent, which may or may not be separated from the aqueous phase of the remaining liquid phase.

Step (c) is typically performed at a temperature of 20-250° C., more preferably 30-220° C., even more preferably 50-150° C. Conveniently, the temperature at which step (c) is performed is the same as the temperature at which step (a) is performed (or slightly lower due to passive cooling).

An advantage of the process according to the invention is that lignin precipitation is more readily accomplished compared to lignin precipitation from prior art organosolv liquors, since the retentate originating from step (a) is more concentrated in lignin and less concentrated in further components that may be present in prior art organosolv liquors, such as monomeric sugars, but are permeated during step (a). For example, less water is needed to accomplish the same amount of lignin precipitation, which in turn leads to reduced energy required for distillation and increased process efficiency.

Sugar Isolation (Step (d))

The suspension originating from step (b) contains organic solvent, precipitated monomeric sugars and typically some remaining water. The precipitate originating from step (b) may also contain (minor amounts of) sugar derivatives, such as glycosides such as ethyl-glucosides and ethyl-xylo sides (e.g. ethyl-α-D-xylopyranoside and ethyl-β-D-xylopyranoside). Those precipitates are preferably isolated from the suspension. Such isolation is conveniently performed by filtration wherein isolated monomeric sugars are obtained as retentate, while the organic solvent ends up in the permeate. Alternatively or additionally, the monomeric sugars are isolated by rinsing the retentate side of the selective permeation membrane after step (b), in particular after pervaporation. The isolation of the precipitated monomeric sugars conveniently occurs by rinsing the selective permeation vessel and membrane with water, during which the precipitated sugars are dissolved and readily discharged from the retentate side of the selective permeation membrane. Step (d) is typically performed at a temperature of 20-250° C., more preferably 25-220° C., even more preferably 50-150° C. Conveniently, the temperature at which step (d) is performed is the same as the temperature at which step (b) is performed (or slightly lower due to passive cooling).

The monomeric sugars may then be used in any way conceivable. Suitably, the monomeric sugars, optionally as mixture with dimeric sugars, are added to the cellulose pulp obtained in the organosolv process, or, preferably, to pulp that has been subjected to enzymatic hydrolysis to monomeric glucose, prior to fermentation thereof to ethanol. As such monomeric sugars that are isolated from the liquor by the process according to the invention are efficiently converted to ethanol, together with the monomeric sugars from the pulp. In one embodiment, the process according to the invention comprises such a further step of combining the isolated sugars with the organosolv pulp and subsequently subjecting the combined product to enzymatic hydrolysis (e.g. by contacting with cellulase enzymes) and optionally fermentation. Such use of the monomeric sugars that are isolated in step (d) enhances the yield of ethanol from biomass, compared to conventional conversion of organosolv pulp to ethanol. Ethanol obtained in such fashion is especially suitable to be used as biofuel. Alternatively, the sugars may be used as such or (chemically) converted to other useful compounds.

The organic solvent that is separated from the monomeric sugars in step (d) may be transferred back to the organosolv reactor, where it is used again as organic solvent in the organosolv process.

Modular System

The invention further relates to an apparatus or system specifically designed to implement the process according to the invention. The system according to the invention is a modular system, in which at least two, preferably at least three modules are in fluid connection with each other. Herein, each module may be a separate unit or two or more modules may be integrated as a single unit. Preferably, each module is a separate unit and is distinguishable as such in the system. The modular system for performing the process according to the invention is suitably incorporated into a biorefinery plant or an organosolv plant. The modular system according to the invention comprises:

(a) a nano filtration module comprising an inlet (a1) for receiving a solution to a first side of a nano filtration membrane, a nano filtration membrane (a2), a first outlet (a3) for discharging a retentate from the first side of the nanofiltration membrane and a second outlet (a4) for discharging a permeate from the second side of the nano filtration membrane;

(b) a selective water removal module, comprising an inlet (b1) for receiving the permeate from nanofiltration module (a), a means (b2) for selective removal of water from the permeate, a first outlet (b3) for discharging a water-depleted liquid or vapour stream and preferably a second outlet (b4) for discharging water from means (b2);

(c) preferably a lignin precipitation module, comprising an inlet (c1) for receiving the retentate from nanofiltration module (a), means (c2) for precipitation lignin from the retentate, an outlet (c3) for discharging precipitated lignin from means (c2) and an outlet (c4) for discharging a liquid stream from means (c2); and (d) preferably a sugar isolation module, comprising an inlet (d1) for receiving the water-depleted stream from module (b), means (d2) for isolating monomeric sugars from the water-depleted stream, a first outlet (d3) for discharging isolated monomeric sugars from means (d2) and a second outlet (d4) for discharging a liquid stream from means (d2).

In the system according to the invention, the different modules are interconnected, i.e. the outlet of one module is in fluid connectivity with the inlet of another module, preferably by means of a conduit. As such, the constant flow of (liquid) streams through the system is enabled. Thus, outlet (a4) is in fluid connection with inlet (b1). In case module (c) is present, outlet (a3) is in fluid connection with inlet (c1). In case module (d) is present, outlet (b3) is in fluid connection with inlet (d1).

The system according to the invention comprises a nanofiltration module (a), comprising a nanofiltration membrane (a2). The nanofiltration module (a) is capable of separating a liquid solution into a retentate and a permeate. Module (a) is designed to receive an incoming liquid solution, preferably an organosolv liquid, via an inlet (a1) to a first side of the nanofiltration membrane (a2). The nanofiltration membrane has two sides, one for receiving the liquid feed solution and discharging the nanofiltration retentate, and one for discharging the nanofiltration permeate. The retentate is discharged from the same side of the nano filtration membrane (a2) as the liquid feed solution is received, and the nanofiltration permeate is discharged from the other side of the nanofiltration membrane. The nanofiltration permeate thus comprises only material that has permeated through the nano filtration membrane (a2). The nanofiltration membrane (a2) employed in the nanofiltration module (a) can be any nanofiltration membrane known in the art, including ceramic membranes and polymeric membranes, and module configurations like spiral wound or tubular. Preferably nano filtration membrane (a2) is a polymeric membrane on a ceramic support, more preferably the polymer is sulfonated polyether ether ketone (SPEEK). Nanofiltration membrane (a2) has a molecular weight cut-off that enables lignin to remain in the retentate and that enables monomeric sugars to permeate through the membrane. Preferably, the molecular weight cut-off is at least 200 Da, more preferably at least 300 Da, most preferably at least 500 Da, and at most 2500 Da, more preferably at most 2000 Da, most preferably at most 1500 Da. Nanofiltration module (a) further comprises a first outlet (a3) for discharging a nanofiltration retentate from the first side of the nanofiltration membrane (a2) and a second outlet (a4) for discharging a nanofiltration permeate from the second side of the nano filtration membrane (a2). Outlet (a3) is in fluid connection with inlet (b1) of the selective water removal module (b), and outlet (a4) is, if present, in fluid connection with inlet (c1) of the lignin precipitation module (c).

The nanofiltration module (a) preferably comprises means to facilitate the permeation of solvent molecules and small solutes such as monomeric sugars through membrane (a2). Any means known in the art may be used to accomplish easy permeation, such as using gravity or transmembrane pressure. Transmembrane pressure may be accomplished by pressurizing the first side of the membrane (i.e. the retentate side) or by depressurizing the second (opposite) side of the membrane (i.e. the permeate side), preferably the first side is pressurized by a pump. Suitably, a pump using hydrostatic pressure to pressurize the first side of the membrane and/or a pump generating suction at the second side of the membrane is used.

The system according to the invention comprises a module (b) for water removal, comprising an inlet (b1) for receiving the permeate from the nano filtration module to a means (b2) for selective removal of water, a means (b2) for selective removal of water from the permeate, a first outlet (b3) for discharging a water-depleted liquid or vapour stream and preferably a second outlet (b4) for discharging water from means (b2). Means (b2) is preferably selected from a selective permeation membrane and a water-selective adsorbent.

According to a first preferred embodiment, module (b) is for selective permeation of water, wherein means (b2) is a selective permeation membrane. The selective permeation module (b-i) comprises an inlet (b1) for receiving the permeate from nanofiltration module (a) to a first side of a selective permeation membrane, a selective permeation membrane (b2), a first outlet (b3) for discharging a retentate from the first side of the selective permeation membrane and a second outlet (b4) for discharging a permeate containing water from the second side of the selective permeation membrane. Selective permeation module (b-i) is capable of fractionating the permeate originating from nanofiltration module (a) into a retentate and a permeate. Module (b-i) is designed to receive the permeate originating from nano filtration module (a) via an inlet (b1) to a first side of the selective permeation membrane (b2). The selective permeation membrane has two sides, one for receiving the nano-filtration permeate and discharging the retentate of the selective permeation, and one for discharging the permeate of the selective permeation. The retentate is discharged from the same side of the selective permeation membrane (b2) as the nanofiltration permeate is received, and the selective permeation permeate is discharged from the other side of the selective permeation membrane. The selective permeation permeate thus comprises only material that has permeated through the selective permeation membrane (b2), typically it essentially consists of water with typically at most 1 wt % other components such as organic solvent. The selective permeation membrane (b2) employed in module (b-i) can be any type of membrane that is known in the art to be selective for permeation of water molecules, while retaining the molecules of organic solvents. The skilled person may find guidance in e.g. Smitha et al., *J. Membr. Sci.* 2004, 241, 1, 1-21. Suitable membranes include polyvinyl alcohol-based polymeric membranes, polyimide-based membranes, zeolite membranes like zeolite A, silica membranes and organic-inorganic hybrid silica membranes. Preferably, an organic-inorganic hybrid silica membranes is used, such as HybSi membranes, known from e.g. Castricum et al. *J. Mater. Chem.* 2008, 18, 2150-2158. Preferably, an organic-inorganic hybrid silica membrane comprising organosilane moieties represented by $Si_pO_q((CH_2)_n)_r$, as further defined above, is used. Module (b-i) further comprises a first outlet (b3) for discharging a retentate of the selective permeation from the first side of the selective permeation membrane (b2) and a second outlet (b4) for discharging a permeate of the selective permeation containing water from the second side of the selective permeation membrane (b2). Outlet (b3) is in fluid connection with inlet (d1) of the sugar isolation module (d), if present. In a preferred embodiment as specified further below, the system according to the invention comprises an organosolv reactor (e), and in that case it is preferred that outlet (b4) is in fluid connection with an inlet (e1) of the organosolv reactor (e), preferably with inlet (e1").

The module (b-i) for selective permeation preferably comprises means to facilitate the selective permeation of water molecules through membrane (b2). Any means known in the art may be used to accomplish easy permeation, such as using transmembrane pressure. Transmembrane pressure may be accomplished by pressurizing the first side of the membrane (i.e. the retentate side) or by depressurizing the second side of the membrane (i.e. the permeate side). Suitably, a pump using hydrostatic pressure to pressurize the first side of the membrane and/or a pump generating suction or vacuum at the second side of the membrane is used. Alternatively or additionally, the pressure at the first side is partly or completely built up by the autogenous pressure of the feed caused by the elevated temperature, in particular when it is above its boiling point. Preferably, the second side of membrane (b2) is depressurized, more preferably the second side of the membrane resides under vacuum (e.g. 0.1 bar or lower, preferably 50 mbar or lower). In case the means to facilitate selective permeation include a pump generating vacuum at the second side, the water molecules appear after permeation at the second side of the membrane in the vapour phase. Hence, it is preferred that module (b-i) comprises means to condense the water vapour (or steam) and to collect the condensed liquid water. Any means known in the art can be used in this respect. Suitable means to condense water include leading the water vapour away from the membrane to an environment having a higher pressure and/or a lower temperature, preferably a lower temperature.

Module (b-i) may be designed for pervaporation or for vapour permeation. In case module (b) is designed for pervaporation, the liquid stream that enters module (b) via inlet (b1) is in direct contact with membrane (b2), i.e. the membrane is placed at or below the (upper) level of the liquid. As such, liquid water molecules present in the nanofiltration permeate are directly capable of permeating through the membrane. In case module (b) is designed for vapour permeation, the liquid stream that enters module (b) via inlet (b1) is not in direct contact with membrane (b2), but the membrane is typically located above the liquid level. Alternatively, module (b-i) comprises means to vaporise the liquid feed, e.g. using heating means or means for decreasing the pressure. As such, liquid water molecules present in the nanofiltration permeate are not in direct contact with the membrane, but water vapour is in direct contact with the membrane, and gaseous water molecules are thus capable of permeating through the membrane. A vapour permeation set-up is preferred, to avoid membrane fouling by precipitating sugars.

According to a second preferred embodiment, module (b) is for selective adsorption of water, wherein means (b2) include a water-selective adsorbent, typically comprised in a bed. The selective adsorption module (b-ii) comprises an inlet (b1) for receiving the permeate from the nano filtration module to the water-selective adsorbent, a water-selective adsorbent (b2), a first outlet (b3) for discharging a water-depleted stream from the water-selective adsorbent and preferably a second outlet (b4) for discharging water from the water-selective adsorbent. Selective adsorption module (b-ii) is capable of fractionating the permeate originating from nanofiltration module (a) into water and a stream which is depleted in water, compared to the incoming nano filtration permeate and which comprises organic solvent. Module (b-ii) is designed to receive the permeate originating from nanofiltration module (a) via an inlet (b1). Typically, module (b-ii) further comprises a crystallisation vessel (b5), wherein the nanofiltration permeate is being received via inlet (b1), and (vapour phase of the solvent mixture of) the nano filtration permeate is capable of being led through a zone (b6) comprising the water-selective adsorbent (b2) and be returned to vessel (b5), e.g. via a recycle. During passage through zone (b6), water is selectively removed from the vapour or liquid phase, preferably vapour phase, while the organic solvent is returned to vessel (b5). As such, the water content in vessel (b5) is gradually reduced and the monomeric sugars precipitate, as such forming a suspension comprising precipitated monomeric sugars and organic solvent. Selective adsorption module (b-ii) further comprises a first outlet (b3) for discharging, preferably from vessel (b5), a water-depleted stream, typically a suspension comprising organic solvent and precipitated monomeric sugars.

Upon performing step (b) of the process according to the invention within selective adsorption module (b-ii), the adsorbent (b2) becomes loaded with water molecules. For continued performance, it is preferred that module (b-ii) comprises means (b7) for regenerating the adsorbent. Such means (b7) preferably include means for heating the adsorbent to a temperature of 200-400° C., at which the adsorbent is dried and releases gaseous water (steam). The module preferably comprises a second outlet (b4) for discharging the water that is released from adsorbent (b2) during regeneration, optionally after condensation of said water. Outlet (b3) is in fluid connection with inlet (d1) of the sugar isolation module (d), if present. In a preferred embodiment as specified further below, the system according to the invention comprises an organosolv reactor (e), and in that case it is preferred that outlet (b4), if present, is in fluid connection with an inlet, preferably with inlet (e1") of the organosolv reactor (e).

Any type of water-selective adsorbent as known in the art may be used as water-selective adsorbent (b2). Preferably, molecular sieves (e.g. zeolites) having a typical minimum pore diameter of 2.8-4.0 Å, preferably 3.0-3.5 Å, are used. Within module (b-ii), the adsorbent material is typically comprised within a bed, preferably a packed bed or a fluidized bed, most preferably a packed bed. Zone (b6) is typically in the form of a column or tube, wherein preferably a tubular compartment is packed with the adsorbent material. The module (b-ii) is designed as known in the art, typically to enable the nanofiltration permeate that is received by inlet (b1), or, preferably, a vapour phase of the solvent mixture comprised in the nanofiltration permeate, to be led through or over the bed comprising adsorbent (b2). During passing through or over the bed, water molecules are selectively adsorbed by the adsorbent (stationary phase), while all other species remain in the mobile phase. The design of the module may be such that the mobile phase is in gaseous form or in liquid form, preferably it is in gaseous form. In a preferred embodiment, the system according to the invention comprises two selective adsorption modules (b-ii), which are capable of operating interchangeably. This enables operating the system in continuous mode, wherein one module (b-ii') is in use for selective adsorption of water from the nanofiltration permeate, while the other module (b-ii") is being regenerated. Upon completion of the regeneration of the adsorbent comprised in module (b-ii''') and (partial of complete) loading of the adsorbent comprised in module (b-ii), the operation of the two modules swaps around, the freshly regenerated adsorbent in module (b-ii") being used for selective adsorption while the (partially or completely) loaded adsorbent in module (b-ii') is being regenerated. Further guidance on the design of selective adsorption module (b-ii) can be found in WO 2012/128624.

The system according to the invention preferably comprises a lignin precipitation module (c). The lignin precipitation module (c) is designed to receive the retentate originating from nanofiltration module (a) via an inlet (c1) to means for precipitation lignin (c2). Inlet (c1) is in fluid connection with outlet (a3) of module (a). Module (c) further comprises a first outlet (c3) for discharging precipitated lignin from means (c2) and a second outlet (c4) for discharging a liquid stream from means (c2). In a preferred embodiment as specified further below, the system according to the invention comprises an organosolv reactor (e), and in that case it is preferred that outlet (c4) is in fluid connection with an inlet (e1) of the organosolv reactor (e), preferably with inlet (e1'''). The means for precipitation lignin (c2) preferably include a further inlet for adding water to the nanofiltration permeate, means for evaporating organic solvent from the nano filtration permeate, or a membrane for selective permeation of organic solvent from the nanofiltration permeate, preferably a HybSi membranes represented by $[Si_pO_q((CH_2)_n)_r]_x$ as described above, but wherein n>8, preferably n=8-20, more preferably n=8-12. Module (c) preferably further comprises means for separating precipitated lignin from the liquor (c5). Such means are known in the art and typically include a decantation set-up or a filtration set-up. The residue of the decantation step-up or the filtrate from the filtration set-up is then discharged via outlet (c3), and the decant of the decantation step-up or the filtrate from the filtration set-up is then discharged via outlet (c4). The modular system may further comprise a drying module, wherein the precipitated lignin discharged from module (c) is dried. Such a drying module is in fluid connection with outlet (c3) and designed to receive the precipitated lignin originating from module (c) via an inlet and to discharge dried lignin via an outlet. The drying module further comprises drying means. Any drying means as known in the art is suitable.

The system according to the invention preferably comprises a sugar isolation module (d). The sugar isolation module (d) is designed to receive the water-depleted stream from module (b) via an inlet (d1) to means for isolating monomeric sugars (d2) from the water-depleted stream. Inlet (d1) is in fluid connection with outlet (b3) of module (b). Module (d) further comprises a first outlet (d3) for discharging isolated monomeric sugars from means (d2) and a second outlet (d4) for discharging a liquid stream from means (d2). In a preferred embodiment as specified further below, the system according to the invention comprises an organosolv reactor (e), and in that case it is preferred that outlet (d4) is in fluid connection with an inlet (e1) of the organosolv reactor (e), preferably with inlet (e1'''). Any means for isolating sugar precipitates as obtained during selective water removal in module (b) is suitable as a means for isolating monomeric sugars (d2). Means (d2) preferably include a filter capable of retaining the precipitated monomeric sugars and permeating (mainly organic) solvent. Typically a microfiltration membrane is employed. Isolated monomeric sugars are then obtained as retentate, while the liquid stream of mainly organic solvent(s) ends up in the filtrate.

Alternatively, module (d) is integrated within module (b), especially when module (b) is designed for pervaporation or for selective adsorption. In case pervaporation or selective adsorption affords precipitated monomeric sugars that remain in module (b), i.e. at the first side of selective permeation membrane (b2) for pervaporation module (b-i) or in the crystallisation vessel (b5) for selective adsorption module (b-ii), the precipitated sugars are conveniently collected by rinsing the retentate side of membrane (b2) or vessel (b5) with water, i.e. the monomeric sugars are dissolved and isolated as such. Thus, in one embodiment, the system according to the invention does not comprise a module (d) and module (b-i) comprises a second inlet (b5) for receiving water to the first side of the selective permeation membrane (b2), and outlet (b3) for discharging a liquid stream comprising water and monomeric sugars, or module (b-ii) comprises a second inlet (b8) for receiving water to the crystallisation vessel (b5), and outlet (b3) for discharging a liquid stream comprising water and monomeric sugars.

The system according to the invention preferably comprises an organosolv reactor (e). Organosolv reactors are analogous to industrial (Kraft) pulping process reactors, and comprise one or more inlets (e1) for receiving biomass and a treatment liquid into a reactor (chamber or vessel), the reactor (e2), one or more outlets (e3) for discharging a solid stream (pulp) and a liquid stream (liquor) from the reactor, and means (e4) for heating the suspension of biomass and treatment liquid within the reactor. The one or more inlets (e1) include typically at least two inlets, one inlet (e1') for receiving the biomass, and at least one inlet for receiving the treatment liquid. The treatment liquid typically consists of water, an organic solvent and optionally acid. These two or three components may be added as mixture to the biomass, or they may be added separately. Preferably, they are added separately. Thus, the organosolv reactor preferably comprises at least two further inlets; (e1") for receiving water and (e1''') for receiving organic solvent. In a preferred embodiment, outlet (b4) is in fluid connection with inlet (e1") and/or outlets (c4) and (d4) are in fluid connection with inlet (e1''') to enable recycling of water and organic solvent, respectively. Preferably, reactor (e) comprises a fourth inlet (e1"") for optionally supplementing liquid components to the treatment liquid (water, organic solvent(s) and/or acid) to make up for any loss during the process according to the invention, as such enabling a constant composition of the treatment liquid or varying composition depending on the type of biomass or the processing conditions employed during organosolv. Preferably, the system according to the invention comprises valves (i), (ii) and (iii) for regulating the amount of each of the liquid streams originating from module (b), (c) and (d) that is rerouted to the organosolv reactor (e).

After organosolv, a pulp and a liquor are discharged from the organosolv reactor. These may be discharged as separate streams via two distinct outlets; one outlet (e3') for discharging the pulp and one outlet (e3") for discharging the liquor, although typically a single suspension is discharged and subjected to solid/liquid separation, typically by filtration, wherein the liquor is obtained as permeate and the pulp as retentate. Means for solid/liquid separation may be integrated with the organosolv reactor, or they may be present as a separate module. The organosolv liquor is to be subjected to nanofiltration in module (a), thus the outlet (e3) or (e3″) for discharging the liquor is in fluid connection with inlet (a1).

EXAMPLES

Example 1: Solubility Test

Figure 1:
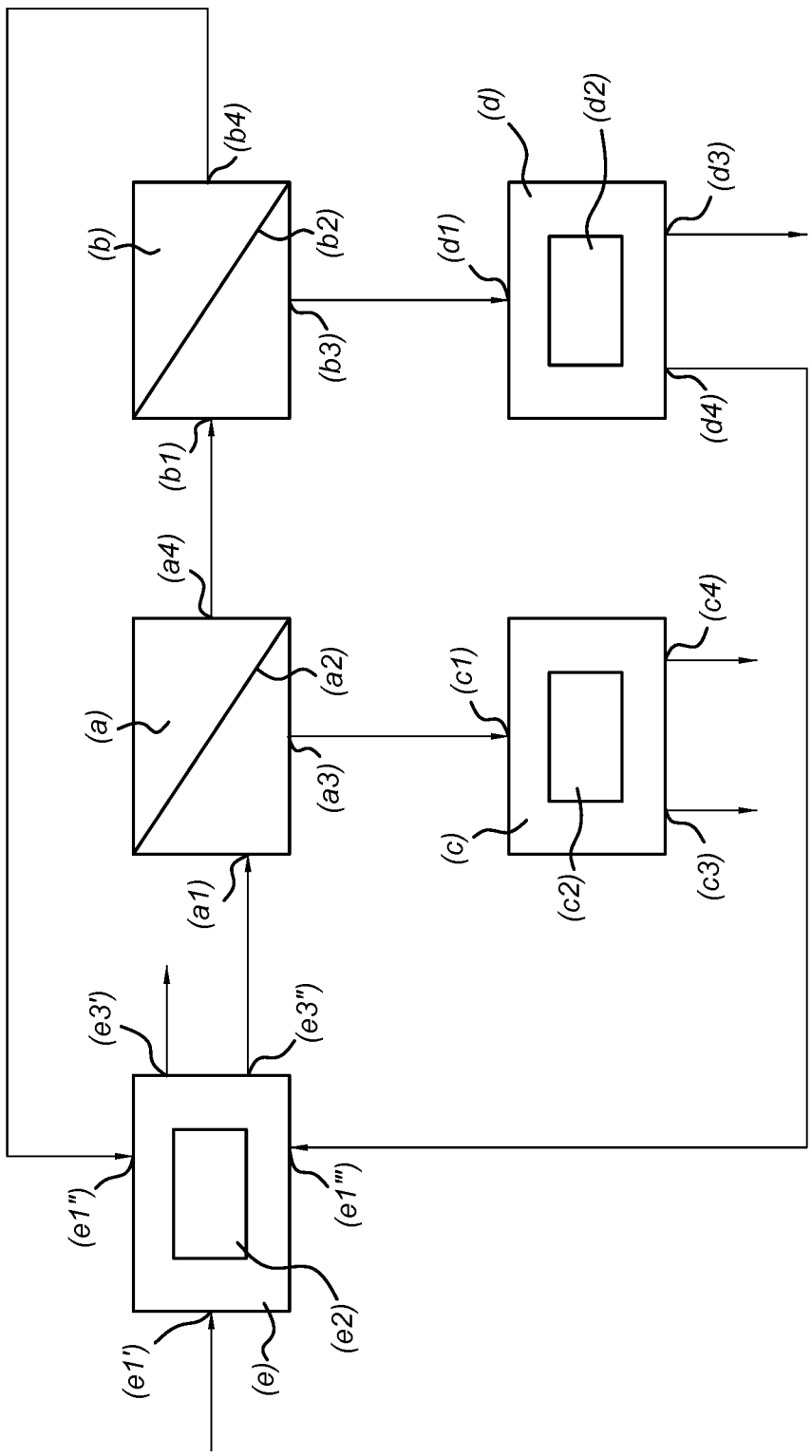
FIG. 1 depicts a preferred system according to the invention, comprising an organosolv reactor (e), a nanofiltration module (a), a module for selective water permeation (b), a lignin precipitation module (c) and a sugar isolation module (d). Reference numbers are in conformity with the description of the system above. The system according to this preferred embodiment is designed to receive biomass via inlet (e1′) and discharge pulp via outlet (e3′), lignin via outlet (c3) and monomeric sugars via outlet (d3).

The solubility of xylose (>99% pure, VWR) in different solvent systems, that are suitable to be used as treatment liquid during organosolv, is tested. Xylose was used as representative of all monomeric sugars, as it is the most abundant carbohydrate found in hemicellulose present in hardwoods and herbaceous biomass and thus in corresponding organosolv liquors. The indicated amount of xylose was added to each solvent system at 20° C. and the suspension was mechanically stirred for 24 h. Hereafter, the saturated solution containing remaining xylose was allowed to settle for 3 h and the liquid was removed. The residue was dried and the amount of undissolved xylose was determined. The results are displayed in table 2.

TABLE 2

| | Xylose solubility | |
|---|---|---|
| solvent system | xylose added (wt %)[a] | xylose not dissolved (wt %)[b] |
| water/acetone 9.9/90.1 (w/w) | 2.3 | 80.2 |
| water/acetone 8.4/91.6 (w/w) | 2.0 | 79.1 |
| water/acetone 4.9/95.1 (w/w) | 2.7 | 93.0 |
| water/acetone 1.9/98.1 (w/w) | 2.7 | 99.1 |
| acetone (100%) | 2.7 | 99.1 |
| water/ethanol 9.7/90.3 (w/w) | 2.3 | 0.0 |
| water/ethanol 7.8/92.2 (w/w) | 2.3 | 16.6 |
| water/ethanol 4.7/95.3 (w/w) | 2.3 | 46.2 |
| water/ethanol 4.3/95.7 (w/w) | 2.2 | 49.7 |
| ethanol (100%) | 2.5 | 82.2 |

[a]based on total weight of the solvent system.
[b]based on total weight of the xylose added.

Indeed, the amount of xylose dissolved decreased upon increasing the organic solvent content, both for ethanol and acetone as organic solvent. Using acetone as organic solvent led to a much decreased xylose solubility, compared to ethanol as organic solvent, indicating that xylose will precipitate more effectively when the process according to the invention employs acetone as organic solvent.

Example 2: Lignin and Sugar Isolation from an Acetone Organosolv Liquor

An organosolv liquor obtained by subjecting biomass (wheat straw) to organosolv at 140° C. during 60 min using a solvent system of acetone/water 50/50 (w/w) (10 L/kg dry biomass) and 60 mM $H_2SO_4$. The liquor was subjected to nanofiltration at 60° C. over a sulfonated polyether ether ketone membrane on a ceramic support, having a molecular weight cut-off of 500 g/mol. Nanofiltration was performed with a VCF of 3 and a flux of 0.2 kg/m²·h·bar, which remained stable for at least 7 days. Upon nano filtration a retentate (NFR) and a permeate (NFP) were obtained.

Figure 2:
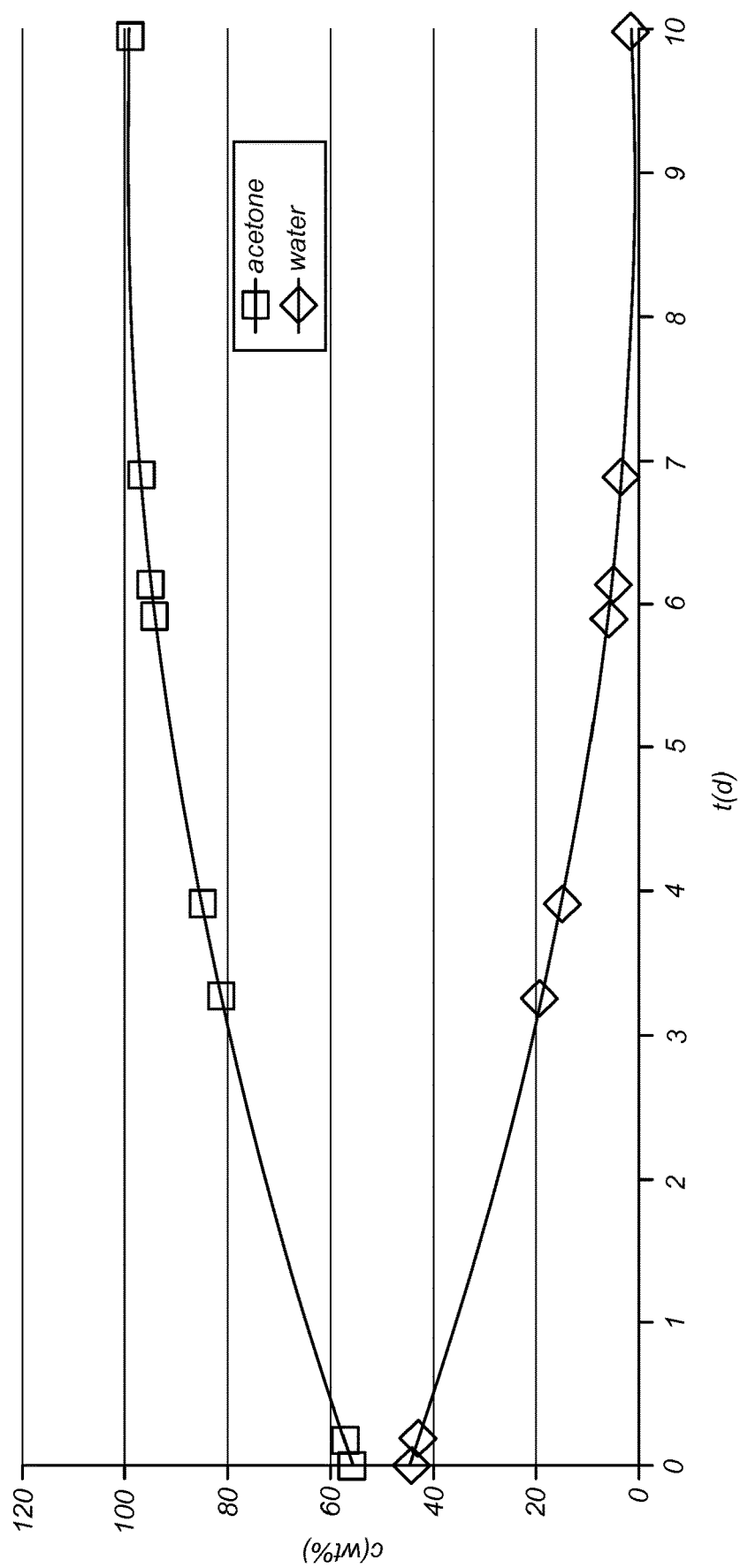
FIG. 2 shows the gradual change in water and acetone content at the retentate side of the pervaporation membrane as function of time during example 2.

The NFP was subjected to pervaporation at 58° C. using a hybrid silica tubular membrane (length 5.4 cm) consisting of a macroporous α-alumina support and a top layer prepared from bis(triethoxysilyl)ethane (BTESE) by sol-gel deposition as described in WO2007/081212. The liquor was placed in direct contact with one side of the membrane (the feed side), while the other side of the membrane (the permeate side) was placed under vacuum. Water permeated through the membrane, evaporated and was then condensed and collected. The water and acetone concentrations at the feed side of the membrane were monitored and are shown in FIG. 2.

Permeation occurred with an initial flux of 4.5 kg/m²·h, which decreased to <0.5 kg/m²h after six days, mainly due to the loss of driving force as the water content on the feed side of the pervaporation membrane decreased from 44 wt % to <5 wt % and only for a small part due to membrane fouling by deposited sugar particles that had formed a layer on the membrane. Membrane fouling by crystallisation was only observed after several days, when the water concentration had dropped to <10 wt %. It is believed that in view of water removal through the membrane, the water concentration close to the feed side of the membrane is locally lower than further away from the membrane in the body of the nanofiltration permeate being subjected to pervaporation, causing sugar crystallisation. Despite the presence of minor amounts of such deposits, the water concentration of the permeate was 99 wt % over the complete 10 days of the experiment and the water concentration at the feed side was decreased to 1.5 wt % at the end of the experiment (see FIG. 2). It is expected that such membrane fouling is completely avoided when selective water permeation is achieved by vapour permeation, as dissolved sugar molecules are then not in direct contact with the membrane. Additionally or alternatively, the water removal could be stopped at a slightly higher remaining water concentration at the retentate side to further reduce membrane fouling.

At the end of the pervaporation experiment, the retentate was cooled to room temperature to stimulate further sugar crystallisation. The suspension was decanted and a sample from the precipitated sugars in the pervaporation vessel and on the membrane was taken. This sample was dissolved in water and analyzed by High Performance Anion Exchange Chromatography with Pulsed Amperometric Detection (HPAEC-PAD) for sugars, confirming the presence all sugars present in the organosolv liquor and nanofiltration permeate in the precipitate. The liquid streams were analyzed by HPAEC-PAD (monomeric sugars) and HPLC (sugar derivatives and organic acids). Results are given in table 3.

TABLE 3 stream compositions (in mg/kg liquid)

| Component | OS Liquor | NFR[a] | NFP[a] | PVP[a] | PVR[a,b] |
|---|---|---|---|---|---|
| Monomeric sugars | | | | | |
| arabinose | 2145 | 3586 | 923 | <13 | 432 |
| fructose | <25 | <25 | <25 | <25 | <25 |
| galactose | 560 | 1070 | 141 | <13 | <13 |
| glucose | 2004 | 3859 | 500 | <13 | 54 |
| mannose | <63 | <63 | <63 | <63 | <63 |
| rhamnose | 129 | 210 | 60 | <13 | 99 |
| xylose | $23.6 \times 10^3$ | $39.7 \times 10^3$ | $10.2 \times 10^3$ | <13 | 5208 |
| Sugar derivatives | | | | | |
| furfural | 1732 | 1342 | 1712 | | 587 |
| HMF[d] | 266 | 216 | 245 | | 628 |
| MMF[d] | <20 | <20 | <20 | | <20 |
| Organic acids | | | | | |
| acetic acid | 3847 | 4578 | 3410 | | 6947 |
| formic acid | <300 | 383 | <200 | | <200 |
| levulinic acid | <60 | 84 | <60 | | 157 |
| Lignin[e] | 4000 | 20000 | <200 | | <200 |

[a]NFR = nanofiltration retentate; NFP = nanofiltration permeate; PVP = pervaporation permeate, PVR = pervaporation retentate.
[b]PVR decant
[d]HMF = 5-(hydroxymethyl)-furfural; MMF = 5-(methoxymethyl)-furfural
[e]Estimates based on peak integral molecular weight measurement by alkaline size exclusion chromatography (SEC).

Nano filtration effectively fractioned the organosolv liquor in a retentate containing substantially all of the lignin and a lignin-depleted permeate. Although some monomeric sugars were retained, the majority ended up in the permeate. Isolation of monomeric sugars from the NFP was readily achieved using pervaporation resulting in a very clean permeate and a retentate comprising precipitated sugars. These precipitated sugars were readily isolated by decantation and rinsing of the pervaporation vessel and membrane with water. Thus, the present process provides an efficient process for isolating both lignin and monomeric sugars from an organosolv liquor.

Example 3: Lignin and Sugar Isolation from an Ethanol Organosolv Liquor

Step A: Nanofiltration separation

A nano filtration membrane was prepared by coating a boehmite sol with a coating velocity of 5 mm/s on a macroporous α-alumina tubular support. This layer was air-dried overnight and was exposed to a heat treatment of 200° C. for 1 hour. After cooling, the membrane was sealed by welding stainless steel caps with a carbon seal inside on the membrane. The membrane had a length of 48 cm and an outer diameter of 14 mm. The molecular weight cut-off of the membrane was 1700 g/mol. To characterize the membrane, first a retention test was executed by dissolving 1 wt % polyethyleneglycol (PEG 2000 gr/mol) in water and using a nano filtration cross flow set up operated at ~20° C. with a feed flow of 1 m³/h. During 38 days of operation, the flux was higher than 1.2 kg/h·m²·bar and the retention was >95%. Flux and retention were more or less constant over time.

An organosolv experiment was performed with wheat straw that was treated using a 20 L batch autoclave reactor under the following conditions: 190° C., 60 min, 60/40 ethanol/water (w/w), liquid to solid ratio=10 kg/kg dw, 30 mM $H_2SO_4$. The organosolv liquor was neutralized with concentrated NaOH solution to a pH value of 6.5 to protect the installation and pump against corrosion. After neutralization the organosolv liquor was transferred to the feed vessel of the nanofiltration cross flow set-up and subjected to nanofiltration over the membrane. The nanofiltration test was done at about 20° C. A pressure of 8 bar was applied on the fluid by the pump and a long term measurement was executed by measuring the flux through the membrane in time. The feed was pumped over the membrane module with a flow of 1 m³/h. The pressure drop over the membrane module was always smaller than 1 bar. The permeate stream was collected and the weight of permeate was followed in time. The starting permeance was around 0.085 kg/bar·h·m², but declined during time especially during the first 3 days of operation. After a period of approximately 5 days, the flux stabilised at about 0.053 kg/bar·h·m².

Figure 3:
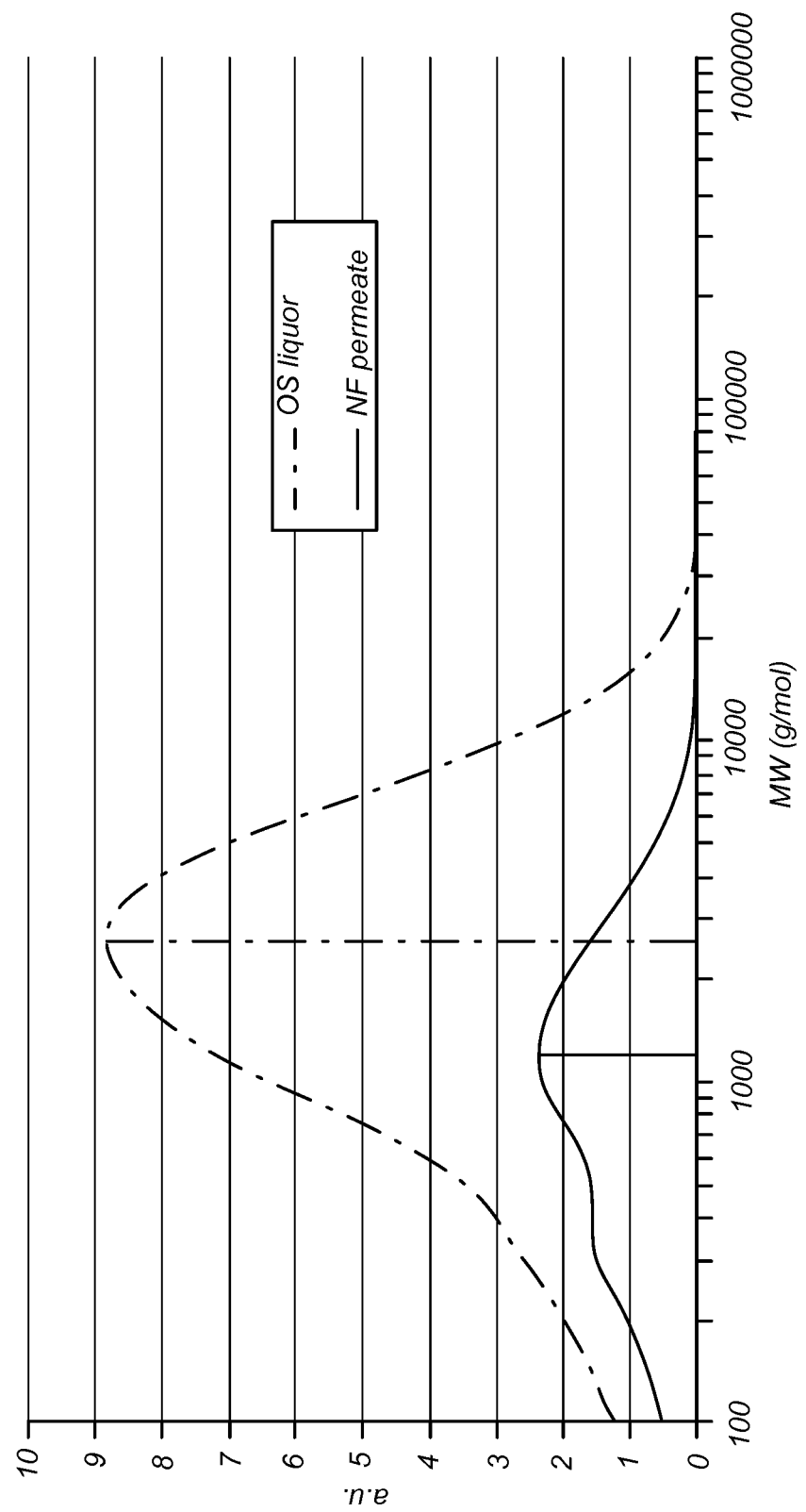
FIG. 3 shows the changes in molecular weight distribution (measured by HPSEC) of the organosolv liquor before and after nano filtration during example 3A.

The molecular weight distribution of all compounds (lignin, carbohydrates, etc) in the feed (organosolv liquor) and in the nanofiltration permeate was analyzed by High Pressure Size Exclusion Chromatography (HPSEC). The results are presented in FIG. 3. The sugar content of the nano filtration retentate and permeate streams was measured by HPAEC-PAD and is given in Table 4.

TABLE 4

Composition of nanofiltration retentate and permeate.

| Compound (mg/kg liquid) | NF Retentate | NF Permeate |
|---|---|---|
| Arabinose | 397 | 411 |
| Cellobiose | 70 | 59 |
| Fructose | 0 | 0 |
| Galactose | 197 | 196 |
| Glucose | 359 | 369 |
| Mannose | 0 | 0 |
| Rhamnose | 40 | 37 |
| Xylose | 3272 | 3363 |
| Ethyl-α-D-glucopyranoside | 17 | 15 |
| Ethyl-β-D-xylopyranoside | 93 | 82 |
| Ethyl-β-glucoside + Ethyl-α-xyloside | 78 | 70 |
| Sum | 4523 | 4602 |

From the HPSEC measurement, it is clear that the molecular weight distribution in the organosolv liquor was between 100 and 30000 g/mol. The feed stream had a peak between 2000 and 3000 g/mol, typical for organosolv lignin. For the nanofiltration permeate, the peak is around 1100 gr/mol. The nanofiltration membrane retains about 80% of the total amount of lignin in the organosolv stream including all components with a weight above 15000 g/mol. As can be seen in table 4, the total concentration of sugars is around 4.6 wt % in both the permeate and the retentate, which shows that these compounds are not retained by the membrane. These results demonstrate that the membrane effectively separates lignin and monomeric sugars present in the organosolv liquor.

Step B: Sugar Isolation by Pervaporation

Hybsi membranes resistant in aggressive media were prepared, having a tubular macroporous α-alumina support and a BTESE top layer, and no mesoporous γ-alumina layer (see WO 2014/025259). These membranes are known to be selective towards water, meaning that water permeates faster than ethanol or other organic liquids. The supports were made by coating a dispersion of very well dispersed 0.4 μm alumina particles (AKP-20, Sumitomo) on a commercial macroporous alumina support (TAMI). After drying at room temperature, the α-alumina layer was sintered at 1200° C. The final porosity of these support layers is about 30% and the average pore diameter is about 0.17 micrometer. Three individual Hybsi membranes of approximately 0.5 μm thickness were prepared by coating of the BTESE sol on the above mentioned porous α-alumina tubular supports, followed by drying and calcination at 240° C. for 1 h under nitrogen (heating/cooling rates were 0.5° C./min, respectively). The water concentrations of the feed and permeate were determined by refractive index at ambient conditions (Mettler Toledo RA510M) and a volumetric Karl Fischer titration.

The prepared membranes were first subjected to a model pervaporation experiment to determine the selectivity of the individual membranes (length about 4.7 cm and outer diameter 1.4 cm) for a feed mixture of 2 wt % xylose in water/ethanol 40/60 (w/w) at a temperature of 75° C. After 9 days, the water concentration at the retentate side was reduced to <20 wt % (>80 wt % ethanol). An initial flux of 3.0 kg/m²·h was observed, which declined to about 0.5 kg/m²·h at day 3 and remained constant afterwards until day 9. Fluxes for xylose (0.0 kg/m²·h) and ethanol (0.1 kg/m²·h at day 0; 0.0 kg/m²·h at day 3-9) were negligible. Initially, the reduction in $H_2O$ flux was mainly due to the loss of driving force as the water content on the feed side of the pervaporation membrane decreased. At lower water concentrations deposited sugar particles that had formed a layer on the membrane also partly caused flux decline. Brownish xylose crystals were observed on the membrane, which were easily removed after the pervaporation experiment by placing the membrane in demineralized water for 48 h. On day 9, the membrane was replaced by a fresh one, after which the flux increased back to 2.5 kg/m²·h and the water content further reduced to about 3 wt % (at day 11). During the entire measurement, the xylose content at the retentate side remained constant at 2 wt %. The water concentration in the permeate was >90 wt % during the entire process. At day 14, the pervaporation experiment was stopped and the retentate was allowed to cool to room temperature, after which sedimentation of xylose crystals was observed.

Figure 4:
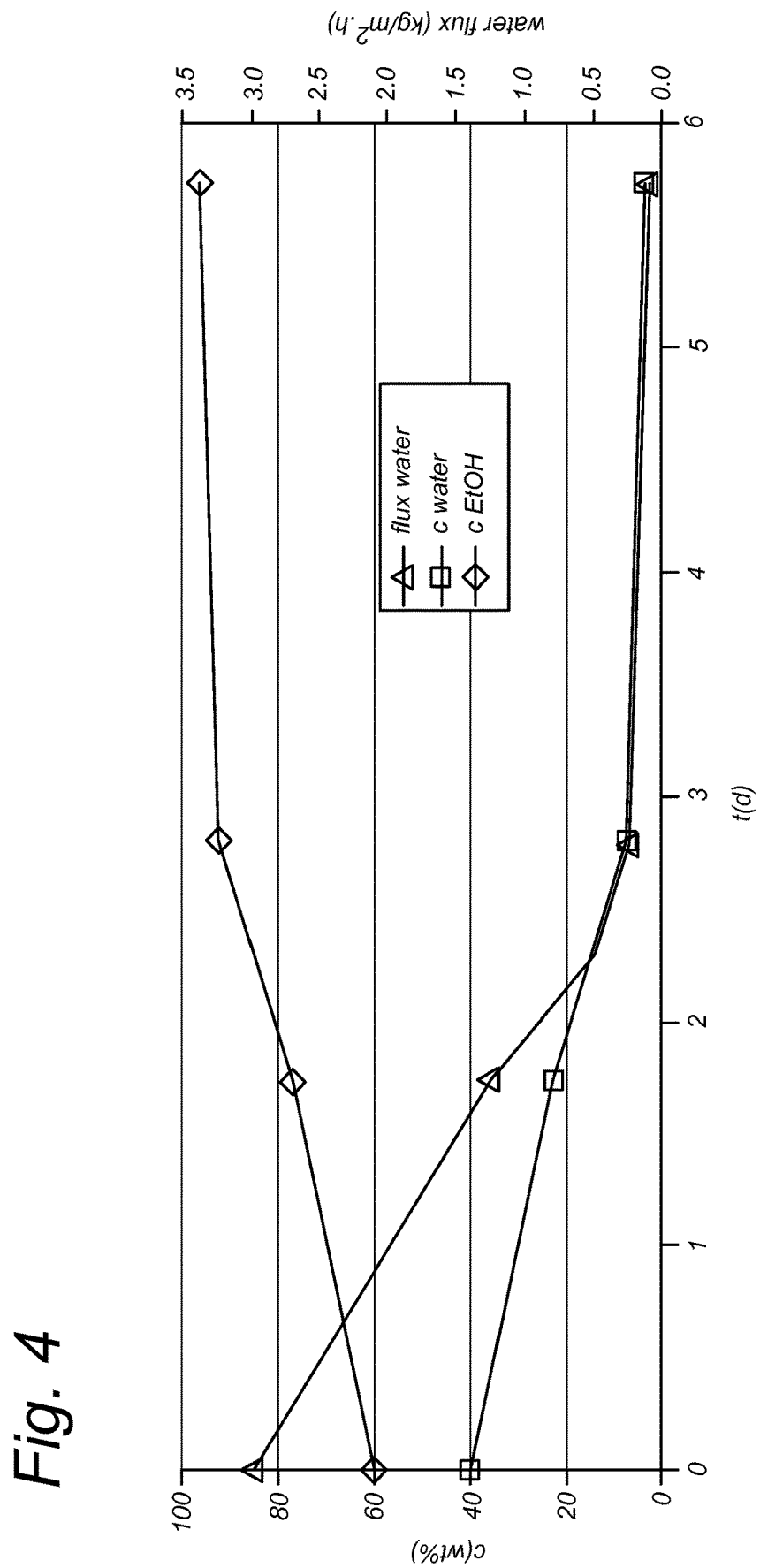
FIG. 4 shows the composition of the retentate and the water flux as function of time, during pervaporation of a nano filtration retentate (example 3B).

Secondly, the nano filtration permeate of step A was subjected to pervaporation over the Hybsi membrane (length about 6 cm). The composition of the retentate and the water flux was measured as function of time over a total of 6 days, see FIG. 4. Water removal from the nanofiltration permeate went fast during the first 3 days of measuring. When the water concentration in the organosolv liquor was reduced to below 7.5 wt %, the water flux had decreased from 3.0 kg/m²·h to 0.3 kg/m²·h. About half of this flux decline can be explained by the reduction of the driving force for water transport as less water is present at the retentate side. When still about 7.5 wt % of water was present in the feed mixture a colour change of the retentate was observed from light transparent brown to cloudy dark brown. The pervaporation process was stopped when the water concentration at the retentate side was 3.5 wt %. The feed mixture was allowed to cool to room temperature and xylose crystals precipitated at the bottom of the feed vessel. The water concentration in the permeate was >90 wt % during the entire process. These results show that separation of carbohydrates by removing the solvent by pervaporation over a Hybsi membrane is successful, and that a separation/precipitation of xylose/carbohydrates from an organosolv mixture was achieved by means of selectively removing water from the mixture via membrane pervaporation and temperature decrease.

The invention claimed is:

1. A process for separating lignin and monomeric sugars from a biomass pre-treatment liquor comprising lignin and monomeric sugars in a solvent mixture comprising water and an organic solvent, the process comprising:
   (a) subjecting the liquor to nanofiltration over a membrane capable of retaining lignin and permeating monomeric sugars; and
   (b) subjecting a permeate originating from step (a) to selective water removal to obtain a suspension comprising precipitated monomeric sugars;
   (c) precipitating lignin from a retentate originating from step (a), and
   (d) isolating precipitated monomeric sugars from the suspension of step (b).

2. The process according to claim 1, wherein the liquor is an organosolv liquor or a solvolysis liquor.

3. The process according to claim 1, wherein the liquor is an organosolv liquor.

4. The process according to claim 2, wherein the organosolv liquor is obtained by subjecting a lignocellulosic biomass to organosolv prior to step (a).

5. The process according to claim 4, wherein the organosolv is performed using a ketone organic solvent.

6. The process according to claim 5, wherein the ketone organic solvent is acetone.

7. The process according to claim 1, wherein the liquor has a temperature of 100 - 280° C. at the beginning of step (a).

8. The process according to claim 1, wherein the nanofiltration membrane has a molecular weight cut-off of 200 - 2500 Da.

9. The process according to claim 8, wherein the nanofiltration membrane has a molecular weight cut-off of 300 - 2000 Da.

10. The process according to claim 1, wherein the selective water removal is accomplished by selective permeation using a membrane selective for permeation of water molecules.

11. The process according to claim 10, wherein the selective permeation is accomplished by vapour permeation.

12. The process according to claim 10, wherein the membrane selective for permeation of water molecules comprises organosilane moieties represented by $Si_pO_q((CH_2)_n)_r$, wherein n=1-7, p=1.6 -2.4, q =2.5-3.5, and r =0.6 -1.4.

13. The process according to claim 1, which does not comprise active cooling and/or heating a solution or suspension.

14. The process according to claim 1, which does not comprise a distillation step.

* * * * *